(12) United States Patent
Gailey, Jr.

(10) Patent No.: US 10,241,780 B1
(45) Date of Patent: *Mar. 26, 2019

(54) ENCAPSULATION OF SOFTWARE SUPPORT TOOLS

(71) Applicant: OPEN INVENTION NETWORK LLC, Durham, NC (US)

(72) Inventor: Kenneth R. Gailey, Jr., Pelham, AL (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/601,729

(22) Filed: May 22, 2017

Related U.S. Application Data

(63) Continuation of application No. 14/736,899, filed on Jun. 11, 2015, now Pat. No. 9,658,844, which is a continuation of application No. 12/121,370, filed on May 15, 2008, now Pat. No. 9,075,496.

(51) Int. Cl.
| | | |
|---|---|---|
| G06F 3/0481 | (2013.01) | |
| G06F 8/65 | (2018.01) | |
| G06F 3/0482 | (2013.01) | |
| G06F 3/0484 | (2013.01) | |

(52) U.S. Cl.
CPC .............. *G06F 8/65* (2013.01); *G06F 3/0482* (2013.01); *G06F 3/04817* (2013.01); *G06F 3/04842* (2013.01)

(58) Field of Classification Search
CPC ........... G06F 8/70; G06F 8/60; G06F 3/04815
See application file for complete search history.

*Primary Examiner* — Haoshian Shih

(57) ABSTRACT

A system, method, and computer program product for facilitating troubleshooting of remote workstation issues reported by an end user to a technical support center analyst in an enterprise network. A plurality of remote workstation software support tools are encapsulated in a support center utility application. Upon receiving a call from an end user (also referred to as customer herein), the remote workstation name for the end user is entered into the support center utility application. This causes information for the remote workstation and end user to be presented to the analyst via a support center utility application interface. At least one encapsulated remote workstation software support tool is launched based on an issue reported by the end user, the tool being pre-populated with information for the remote workstation from the support center utility application interface. The launched remote workstation software support tool is utilized to perform at least one troubleshooting step to resolve the issue reported by the end user.

18 Claims, 12 Drawing Sheets

ENCAPSULATION OF SOFTWARE SUPPORT TOOLS

CROSS-REFERENCE TO RELATED APPLICATIONS

This application is a continuation of and claims priority from U.S. patent application Ser. No. 14/736,899, filed on Jun. 11, 2015, entitled ENCAPSULATION OF SOFTWARE SUPPORT TOOLS, now issued U.S. Pat. No. 9,658,844, issued on May 23, 2017, which is a continuation of U.S. patent application Ser. No. 12/121,370, filed on May 15, 2008, entitled ENCAPSULATION OF SOFTWARE SUPPORT TOOLS, now issued U.S. Pat. No. 9,075,496, issued on Jul. 7, 2015, incorporated by reference herein in their entirety.

BACKGROUND OF THE INVENTION

Embodiments of the invention relate generally to information processing on a computer network and, more particularly, to methods and systems for encapsulating software support tools for call center operation in a corporate wide area network.

In computer network communications, there is a need for help desk personnel or Information Technology (IT) support staff to access end user workstations or remote servers. A large enterprise will typically have a wide area network (WAN) with many thousands of workstations that are connected to various servers in the network. In a typical large enterprise network, the devices being accessed are geographically dispersed from the support personnel.

When an end user experiences problems with software on his workstation, remote control software is used to identify specific error messages or observe a series of dialog boxes. There are a number of technical solutions that address remote access to workstations in a Windows environment. These include Symantec PC Anywhere, VNC, Citrix, Windows Terminal Services, and Timbuktu among others.

SUMMARY OF THE INVENTION

Embodiments of the invention are directed to a method and system to make the job of a remote IT support person located in a call center (e.g., Help Desk) easier via automation and centralization. The encapsulated software support tools application pulls a plurality of remote workstation tools into one location to make the tools immediately available to IT support personnel, referred to more generally as users herein. The user has to obtain the remote workstation name and input that name into the application to begin. After the workstation name is loaded, the application will present information about the remote machine and logged-on user with the option to launch additional tools for more information. The additional tools include Microsoft supplied workstation tools and third party tools. Application launchers are available in the prior art, but are not designed to encapsulate support tools for the remote workstation.

The invention addresses business needs to make access to tools more centralized, to improve first call resolution/troubleshooting, and to simplify training of employees. The advantage is that each remote workstation tool launches pre-populated with information about the remote workstation that is supplied when the application is opened. This saves time for IT support personnel from having to locate tools and then supply the workstation name for each tool in order to perform troubleshooting steps.

In one embodiment of the invention, a method is provided for facilitating troubleshooting of remote workstation issues reported by an end user to a technical support center analyst in an enterprise network. A plurality of remote workstation software support tools are encapsulated in a support center utility application. Upon receiving a call from an end user (also referred to as customer herein), the remote workstation name for the end user is entered into the support center utility application. This causes information for the remote workstation and end user to be presented to the analyst via a support center utility application interface. At least one encapsulated remote workstation software support tool is launched based on an issue reported by the end user, the tool being pre-populated with information for the remote workstation from the support center utility application interface. The launched remote workstation software support tool is utilized to perform at least one troubleshooting step to resolve the issue reported by the end user.

The system includes a plurality of components that perform the steps of the method when operated on a computer system, such as a server. The computer program product includes a computer readable medium having computer instructions embedded therein, the computer readable medium implementing the method when operated on the computer system.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION OF THE EMBODIMENTS

The following description of the embodiments of the invention is provided as an enabling teaching of the invention including its best, currently known embodiment. Those skilled in the relevant art will recognize that many changes can be made to the embodiments described, while still obtaining the beneficial results of the invention. It will also be apparent that some of the desired benefits of the embodiments described can be obtained by selecting some of the features of the embodiments without utilizing other features. Accordingly, those who work in the art will recognize that many modifications and adaptations to the embodiments of the invention are possible and may even be desirable in certain circumstances, and are a part of the invention. Thus, the following description is provided as illustrative of the principles of the embodiments of the invention and not in limitation thereof, since the scope of the invention is defined by the claims.

It should be noted that in the following description, Microsoft Windows platforms are used to explain embodiments of the invention. In particular, a number of references are made to the Windows NT operating system platform because of its widespread deployment in corporate enterprise networks. The concepts described herein are equally applicable to other Windows operating systems, including, but not limited to, Windows XP and Vista. The concepts can also be implemented in other environments such as Unix or Linux.

Figure 1:
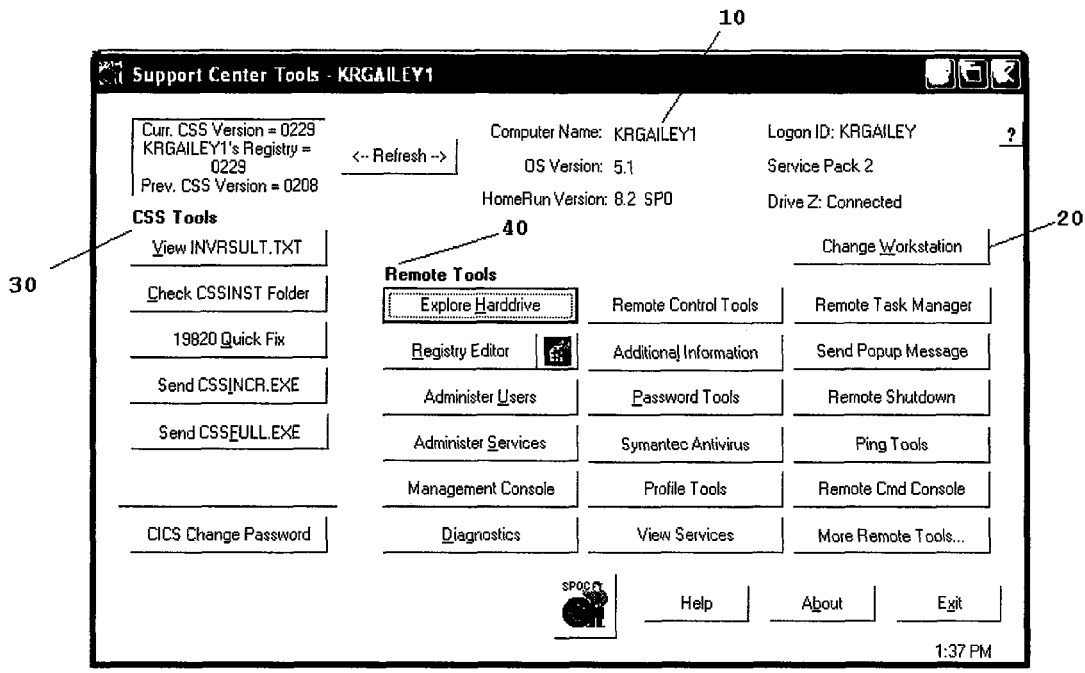
FIG. 1 illustrates a user interface for encapsulating a plurality of tools available to a call center operator to launch on a remote workstation in accordance with an exemplary embodiment of the invention.

FIG. 1 illustrates a user interface for encapsulating a plurality of tools available to a call center operator to launch on a remote workstation. The Remote Computer Information section 10 displays the Logon ID, Drive Connected, and Change Workstation button. The Logon ID shows the identifier of the person who last successfully logged onto the NT workstation. The Logon ID is color-coded to show whether the person is logged onto the workstation. For example, if the Logon ID field is red, the person is not logged on to the workstation. If the Logon ID field is black, the person is logged on. The Drive Connected field shown in Remote Computer Workstation section 10 of FIG. 1 indicates that a drive has been connected to the remote workstation and which drive is connected. If the user is not browsing a drive when he exits from the encapsulated software support tools application or changes workstation, the drive will be disconnected.

Figure 2:
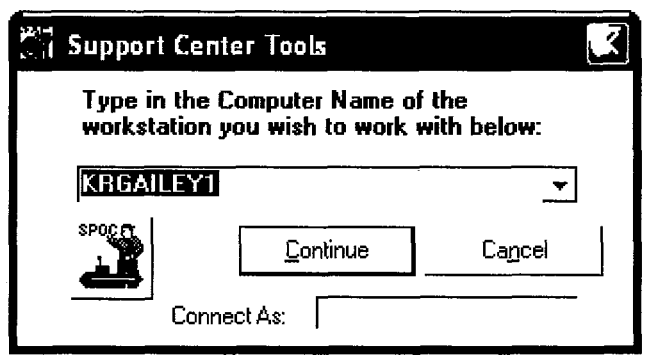
FIG. 2 illustrates a Change Workstation dialog box that can be used in an exemplary embodiment of the invention.

The Change Workstation button 20 pulls up a dialog box that allows the user to enter the name of a new remote workstation to view. FIG. 2 illustrates an exemplary Change Workstation dialog box. Because the encapsulated software support tools application is based on working with a remote workstation, the user must supply the computer name of the remote workstation when the encapsulated software support tools application is loaded. Therefore, the user will also see this dialog box when he first opens the encapsulated software support tools application. The dialog box includes a pull down list that will show the last ten computers to which the user has successfully connected. The Ping Tools button in the lower left corner of the dialog box allows the user to check for the existence of a workstation on the network. The Ping Tools functionality is described in more detail below. The Connect As field in the dialog box allows the user to type in the Windows NT ID to use in order to establish a connection with the remote workstation. This field can be used when a workstation will ping but the encapsulated software support tools application cannot connect to the workstation using the Windows NT ID. In this situation, the user could try ComputerName\Administrator in the Computer Name field. After the Connect As field is populated, a Password field will appear to allow the user to enter the password needed to connect to the remote workstation.

In one exemplary embodiment, the Customer Service System (CSS) Tools section 30 in FIG. 1 can be used to troubleshoot various CSS problems. CSS is used to refer generically to an internal enterprise system for maintaining customer accounts, billings, collections, and related customer data. At the top of the CSS Tools section 30, the current CSS version that has been deployed, the version of CSS that the remote computer's registry reports being installed, and the previous version of CSS are displayed.

In one exemplary embodiment, selecting the View INVRSULT.TXT button loads the C:\INVRSULT.TXT file in Notepad, which list the files that are out of synchronization with the latest version of CSS. Selecting the Check CSSINST Folder button pulls up a directory listing of the C:\CSSINST folder, which is where CSS Delivery files are placed by System Management Server (SMS) deployments. Systems Management Server, available from Microsoft Corporation, allows for automated inventory management of workstations, software deployment, and remote troubleshooting for medium to large wide area networks. Selecting the 19820 Quick Fix button will quick fix an Inventory of Files Error 19820, which indicates a network or server problem. A file is copied to the remote workstation and a registry entry is changed. Selecting either the Send CSSINCR.EXE button or the Send CSSFULL.EXE button will create batch files on the remote computer for download of the incremental or full install files, respectively. Selecting the CICS Change Password button assists in verifying that a CICS password, used by CSS, is synchronized with a caller's NT password. Customer Information Control System (CICS) is an IBM-licensed program that enables transactions entered at remote terminals to be processed concurrently by user-written application programs.

The Remote Tools section 40 in FIG. 1 allows various troubleshooting options on a remote workstation. The following is an overview description of the options available to the user. Selecting the Explore Hard Drive button from the Remote Tools section 40 of FIG. 1 results in an exemplary Harddrive Options dialog box providing the options depicted in FIG. 3.

The Explore C:\ option opens a Uniform Naming Convention (UNC) path to the C: drive on the remote workstation in an Explorer window. It is a standard way to access network shares in Windows NT. The format of an UNC path is: \\<servername>\<sharename>\<directory>
where: <servername> is the network name; <sharename> is the name of the share; and <directory> is any additional directory below the shared directory.

The Explore Windows Folder option opens an UNC path to the C:\Windows folder on the remote workstation in an Explorer window.

The Explore Profiles Folder option opens a Profile Tools dialog box. The Profile Tools functionality is described in more detail below.

The Explore Temp Folder option opens an UNC path to C:\Temp folder on the remote workstation in an Explorer window.

Figure 4:
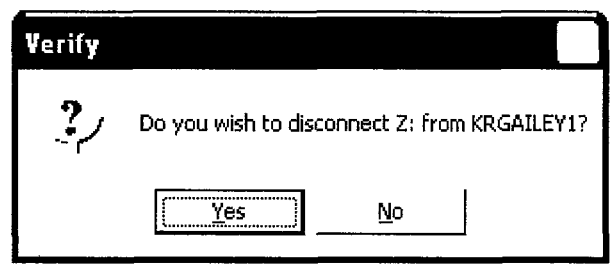
FIG. 4 illustrates an exemplary drive disconnection verification message that can be displayed to the user in an exemplary embodiment of the invention.

The Connect Drive To option connects a drive to the remote workstation. Once this option is selected it will be disabled to prevent connecting additional drives to the remote workstation. The drive connected will be indicated in the Remote Computer Information display section 10 in FIG. 1. An attempt is made to disconnect the drive when Change Workstation is used to successfully connect to a new workstation or when the encapsulated software support tools application is closed. If the Verify Disconnect option is checked the user will receive a confirmation dialog box depicted in FIG. 4 prior to disconnection of the drive. The Connect Drive option is also available in the Profiles Tools menu described below.

Figure 3:
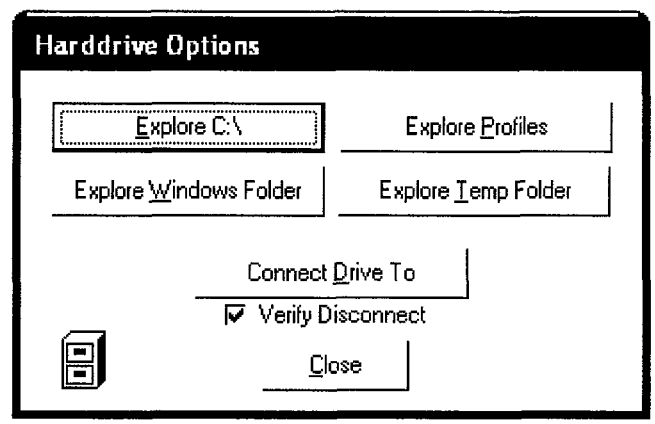
FIG. 3 illustrates an exemplary Hard Drive Options dialog box that can be used in an exemplary embodiment of the invention.

The File Manager icon located in the lower left corner of hardware drive options dialog box of FIG. 3 launches Windows File Manager instead of Explorer. Since File Manager must have the remote workstation connected to a drive, the user should use the Connect Drive To option before selecting File Manager.

Selecting the Registry Editor button from Remote Tools section 40 of FIG. 1 loads the Microsoft Registry Editor containing the Windows Registry Configuration. This editor could be used to view or modify the remote workstation's registry. Registry hives are logical sections of the registry. A registry hive is a group of keys, sub-keys, and values in the registry that has a set of supporting files containing data backups. Certain predefined keys are used by Windows systems. The HKEY_LOCAL_MACHINE hive key contains configuration information particular to the computer for any user. The HKEY_USERS hive key contains all the actively loaded user profiles on the computer.

Selecting the Administer Users button from Remote Tools section 40 of FIG. 1 loads the Local Users and Groups tool populating it with the user information on the remote workstation. This tool can be used to determine what local accounts have been created for the workstation. Most frequently, this tool will be used to add enterprise user IDs to the Administrator group on the remote workstation.

Selecting the Administer Services button from Remote Tools section 40 of FIG. 1 loads the Services tool populating it with the services on the remote workstation. Most frequently, this tool will be used to stop and start Services on the remote workstation.

Selecting the Management Console button from Remote Tools section 40 of FIG. 1 loads the Computer Management tool populating it with management tools on the remote workstation. This allows access to the Event Viewer for application, security, and system logs. The tool is used most frequently to determine what service or driver is not loading at system startup. The Computer Management tool also includes the Local Users and Groups and Services tools discussed above.

Selecting the Diagnostics button from Remote Tools section 40 of FIG. 1 loads the System Information tool populating it with various diagnostic information about the remote workstation. This displays environment, services, devices, system BIOS, display adapter, resources, and network information.

Figure 5:
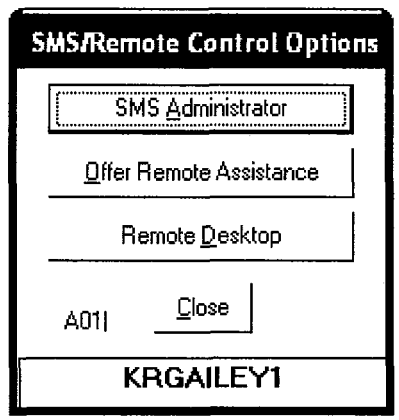
FIG. 5 illustrates an exemplary SMS/Remote Control Options dialog box that can be displayed to the user in an exemplary embodiment of the invention.

Selecting the Remote Control Tools button from Remote Tools section 40 of FIG. 1 opens the exemplary SMS Options dialog box depicted in FIG. 5. The options that can be selected in an exemplary embodiment are described in the following paragraphs.

The SMS Administrator option opens SMS Administrator populated with the SMS Master Site server connection. The Master Site is the server that contains all computers in the enterprise. The user can then search for the remote workstation computer name to use the remote control options provided by SMS.

The Offer Remote Assistance option allows the user to open Microsoft's Help and Support Center in an Offer Remote Assistance mode. The remote computer name is prepopulated. The user can click Start Remote Assistance to begin a remote control session with the remote workstation.

The Remote Desktop option allows the user to opens Microsoft's Remote Desktop Connection Dialog to allow the user to login to the remote workstation with the user's credentials or his/her own credentials. Remote Desktop does not allow the remote user to interact with the workstation when used.

Selecting the Additional Information button from Remote Tools section 40 of FIG. 1 requires that a user be logged into the remote workstation. The following information will be gathered from the remote workstation's registry: central profile location of the user logged on, server information, printer information, NT group information, and persistent connections.

Figure 6:
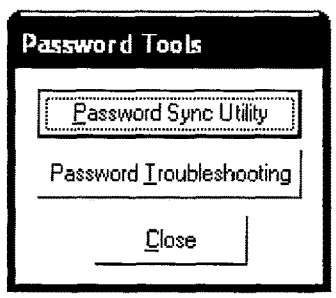
FIG. 6 illustrates an exemplary Password Synchronization dialog box that can be displayed to the user in an exemplary embodiment of the invention.

Selecting the Password Tools from Remote Tools section 40 of FIG. 1 will bring up the dialog box shown in FIG. 6. As illustrated, the dialog box provides two options: Password Sync Utility and Password Troubleshooting.

The Password Sync Utility option launches the Password Synchronization utility populating it with the server list for the person logged onto the remote workstation. The user can add and delete servers from the list as needed. The Password Synchronization program supplements the Windows Password Change to allow synchronization of passwords for a user's same ID on non-Windows platforms, such as a CICS mainframe, Novell servers, and ELAN servers, with the user's Windows password.

The Password Troubleshooting option collects information about the remote workstation and user needed Tier II or Tier III server or network support groups to troubleshoot why the remote user's password is not synchronizing throughout their Windows domain. Tier II or Tier III support groups refer to expert specialized support outside of the service desk or help desk. Information gathered by this option are the remote computer name, the user's logon ID, the domain controller used, and the logon server used.

Figure 7:
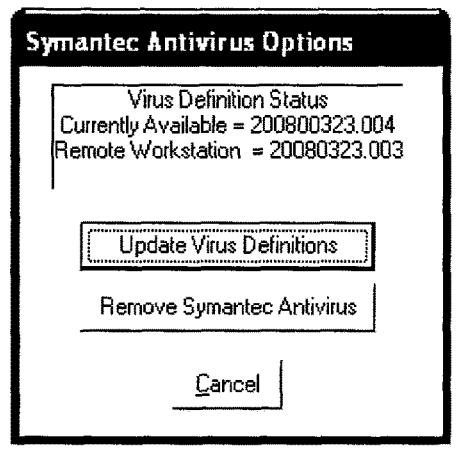
FIG. 7 illustrates an exemplary Antivirus Options dialog box that can be displayed to the user in an exemplary embodiment of the invention.

In one embodiment, selecting the Symantec Antivirus button from Remote Tools section 40 of FIG. 1 displays the Symantec Antivirus Options dialog box shown in FIG. 7. The display in this dialog box shows the user the version of Virus Definitions that are currently available for deployment to the remote workstation from the encapsulated software support tools application and shows the version of the Virus Definitions that are on the remote workstation. This option is based upon Symantec Antivirus software, but with some research could possibly work with any commercially software suitable for that purpose, including McAfee or other well-known antivirus products.

The Update Virus Definitions option will copy the latest Virus Definitions to the remote workstation and then monitor the workstation for two minutes to verify that the installation works properly. This option will only be enabled if the currently available version is greater than the version on the remote workstation.

The Remove Symantec Antivirus option removes the Symantec Antivirus software from the remote workstation if the program becomes corrupted. It can then be reinstalled.

Figure 8:
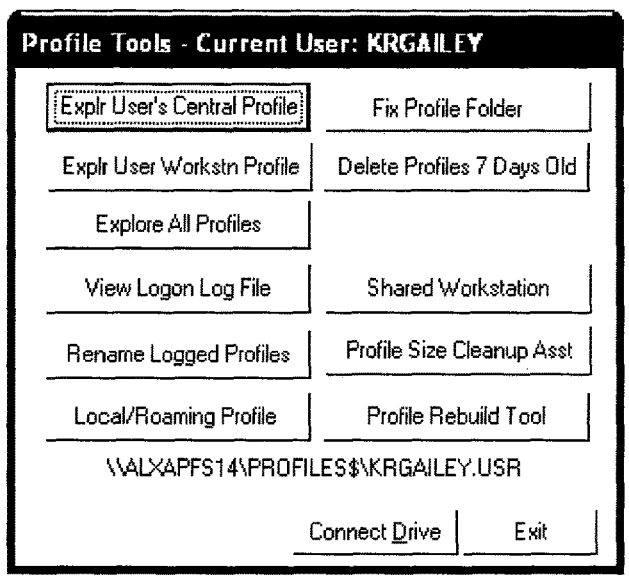
FIG. 8 illustrates an exemplary Profile Tools menu dialog box that can be displayed to the user in an exemplary embodiment of the invention.

Selecting the Profile Tools button from the Remote Tools section 40 of FIG. 1 displays the Profiles Tools menu dialog box shown in FIG. 8.

The Explr User's Central Profile button will launch a Windows Explorer view of the Central Profile for the user logged onto the remote workstation.

The Explr User Workstn Profile button will launch a Windows Explorer view of the user's profile on the remote workstation.

The Explore All Profiles button will launch a Windows Explorer view of all profile folders on the remote workstation.

The View Logon Log File button will display the logon log file for the user logged onto the remote workstation.

The Rename Logged Profiles button will rename the profile folders for the user logged onto the remote workstation on all workstations the user has logged onto based on information found in the Logon Log File. This option is used when profile corruption has occurred to avoid a user from corrupting their roaming profile again by logging onto a workstation that contains a copy of their previously corrupted profile.

Figure 8A:
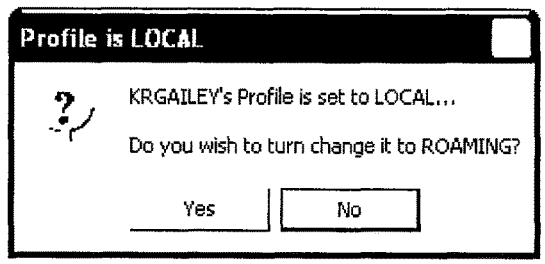
FIG. 8A illustrates an exemplary Profile status dialog box that can be displayed to the user in an exemplary embodiment of the invention.

The Local/Roaming Profile button displays the Profile dialog box depicted in FIG. 8A to display the Local or Roaming status of the user's profile on the remote workstation and allow the option to toggle the status of the profile.

The Fix Profile Folder button is normally disabled, but will be enabled if issues are detected with the name of the user's profile folder on the remote workstation. This script can be used to correct that issue.

The Delete Profiles 7 Days Old button will delete user profiles on the remote workstation older than 7 days. This option utilizes the Microsoft Windows Operating System User Profile Deletion Utility v5.2—Microsoft Corporation. All rights reserved—usage: DELPROF [/Q] [/I] [/P] [/R] [/C:\\<computername>] [/D:<days>].

Figure 8B:
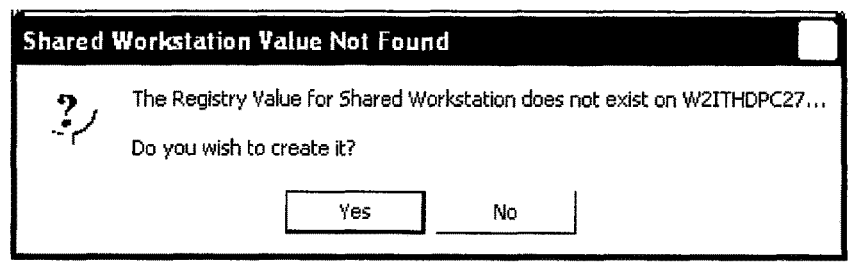
FIG. 8B illustrates an exemplary Shared Workstation registry value existence dialog box that can be displayed to the user in an exemplary embodiment of the invention.
Figure 8C:
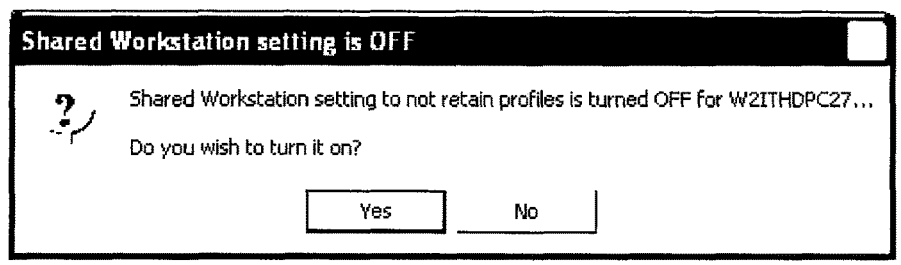
FIG. 8C illustrates and exemplary Shared Workstation status dialog box that can be displayed to the user in an exemplary embodiment of the invention.

The Shared Workstation button checks the registry of the remote workstation for the shared workstation value, if the value does not exist the dialog box depicted in FIG. 8B is displayed. If Yes, is selected in the FIG. 8B dialog then the value is created in the remote workstations registry. Once the value exists in the remote registry the dialog box depicted in FIG. 8C appears to display whether the remote workstation is configured as a shared workstation or not. The dialog depicted in FIG. 8C also allows the option to toggle shared workstation on or off. Shared workstations do not retain copies of the user's profiles after remote users log off to conserve disk space.

The Profile Size Cleanup Asst and Profile Rebuild Tool buttons are internal tools that are used to assist with profile size cleanup and profile rebuild for the user logged onto the remote workstation. These tools have been scripted to allow for pre-population of the remote user name and computer name information.

For informational purposes, the UNC path below the command buttons shows the roaming profile path for the user logged onto the remote workstation. The Connect Drive option works as described in the Explore Harddrive options above.

Figure 9:
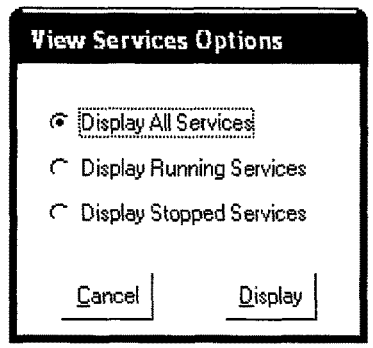
FIG. 9 illustrates an exemplary View Services Options dialog box that can be displayed to the user in an exemplary embodiment of the invention.

Selecting the View Services button from Remote Tools section 40 of FIG. 1 displays the View Services Options dialog box shown in FIG. 9. The options are Display All Services, Display Running Services, and Display Stopped Services. The user selects the one he wants to see and clicks the Display button. The results will be displayed in Notepad.

Selecting the Remote Task Manager button from Remote Tools section 40 of FIG. 1 will launch Remote Task Manager™ connected to the remote workstation. Remote Task Manager (RTM) is a systems control interface available from SmartLine, Inc. that can be run from any remote Windows NT/2000/XP computer. This enables systems administrators to control most aspects of a remote environment. The simple-to-use, tabbed interface separates applications, services, devices, processes, events, shared resources, performance monitor and network monitor, making each of these very easy to manage.

Figure 10:
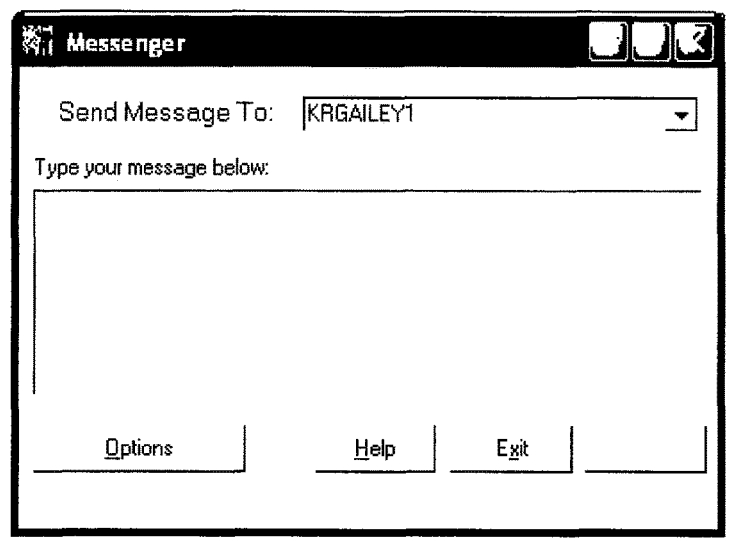
FIG. 10 illustrates an exemplary Messenger program user interface that can be displayed to the user in an exemplary embodiment of the invention.
Figure 11A:
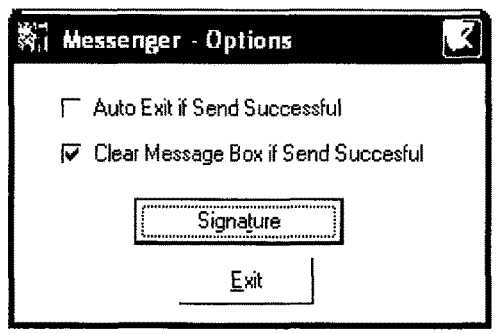
FIGS. 11A-11B illustrate exemplary Messenger—Options and Signature dialog boxes that can be displayed to the user in an exemplary embodiment of the invention.
Figure 11B:
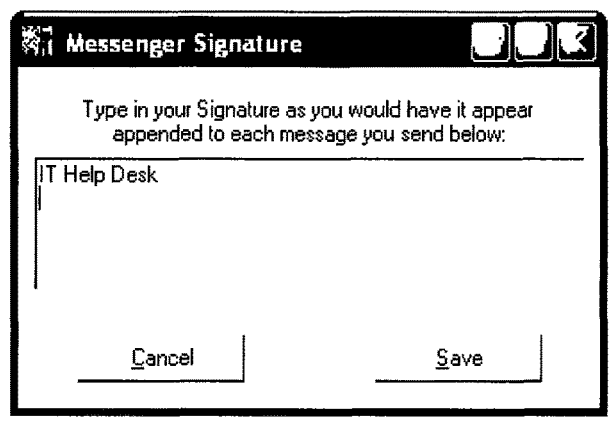

Selecting the Send Popup Message button from Remote Tools section 40 of FIG. 1 launches the Messenger program shown in FIG. 10 that allows the user to send a popup message to the remote workstation. The user types in a message and clicks the Send button. Clicking the Options button will load the Messenger—Options dialog box shown in FIG. 11A that allows the user to exit Messenger when a transmission is successful or clear the message box if transmission is successful. The Exit option overrides the Clear option. If the user clicks the Signature button in this dialog box, the Messenger Signature dialog depicted in FIG. 11B will open which allows the user to personalize a signature which is appended to the bottom of each message that he sends. Microsoft's messenger service must be running on the local and remote workstations for the Messenger program to function properly.

Selecting the Remote Shutdown button from Remote Tools section 40 of FIG. 1 will shutdown and restart the remote workstation using the Shutdown GUI utility from the NT Resource Kit. This utility allows the user to remotely shut down or reboot a computer running Windows NT. It can be run either with or without command-line parameters. If the user chooses this option, he will be warned that the encapsulated software support tools application will not function properly while the remote workstation is shutdown. The user will be presented with a Command window that will display a continuous ping of the workstation. The user will see it leave the network and then return. When it returns, the user can close the Command window and work with the encapsulated software support tools application again.

Figure 12A:
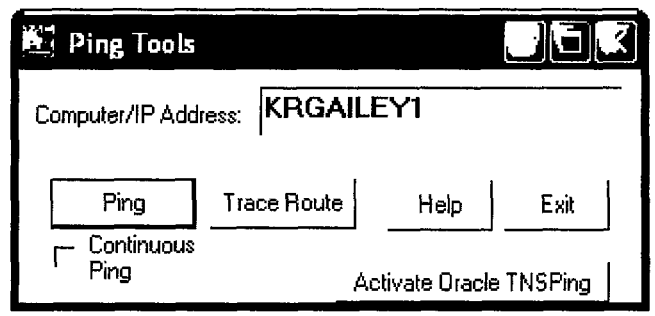
FIGS. 12A-12B illustrate exemplary Ping Tools user interface dialog boxes that can be displayed to the user in an exemplary embodiment of the invention.
Figure 12B:
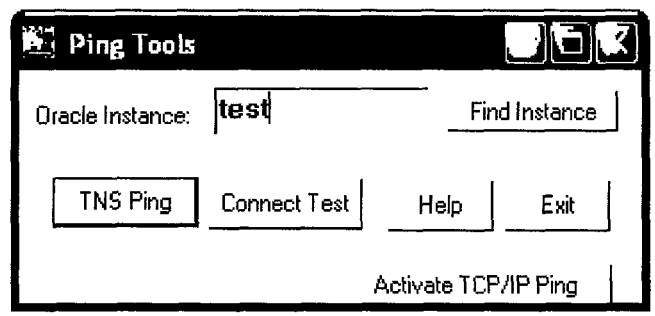

Selecting the Ping Tools button from Remote Tools section 40 of FIG. 1 will launch the Ping Tools application that allows the user to perform a ping, continuous ping, or trace route on the remote workstation in the TCP/IP ping mode. The user interfaces are shown in FIGS. 12A-12B. Ping Tools are used most often to ensure that a workstation is attached to the network. Continuous Ping is useful to ensure that a shutdown and restart of the remote workstation occurs. The user can watch the remote workstation leave the network and then return. In a second ping mode, the user can click the Activate Oracle TNSPing button to ping or connect test an Oracle database instance. The TNSPing utility determines whether or not a service, e.g., Oracle database, Oracle Names server, on an Oracle Net network can be reached successfully. The user can click the Find Instance button shown in FIG. 12B to search for an Oracle instance by its application name, server, or acronym. When the user uses the Find Instance button to locate an instance, a Ping Server button will also appear that allows pinging the server (e.g., UNIX) on which the database runs. The user can click the Activate TCP/IP Ping button to return to the TCP/IP ping mode and the original display.

In an exemplary embodiment, the user can select the Remote Cmd Console (Rconsole) button from Remote Tools section 40 of FIG. 1. Remote Console allows the user to load a command prompt on his workstation which resides on a remote workstation. Commands typed in the session execute on the remote workstation. Remote Console is installed to allow killing a process on a remote workstation without the need to SMS Remote to the workstation and use Task Manager. The Tlist executable and Kill executable are also installed on each workstation with Rconsole for that purpose.

After the user has established an Rconsole session with the remote workstation, he can use the Tlist command to see the running processes. The Tlist command can find the process names and process IDs of currently running processes. The user can use the Task Killing Utility Kill command to kill any process running on the remote workstation.

The syntax for the Kill command is as follows:

kill [/f] {process_id|pattern} where:
/f forces the process to terminate, rather than allowing it to halt itself;
process_id specifies the ID number of the process to be ended.
pattern can be either a complete process name, or an expression using wildcards that will be compared to the process names and window titles of all current processes. For example, typing kill *help* will end all processes with process names or window titles that contain "help".

Remote Console has a number of limitations. It cannot be used to successfully launch an application on a remote workstation because everything launched resides in the background. For example, if the user launches Notepad.exe, he will not see it on his screen, but it will be a running process.

Figure 13:
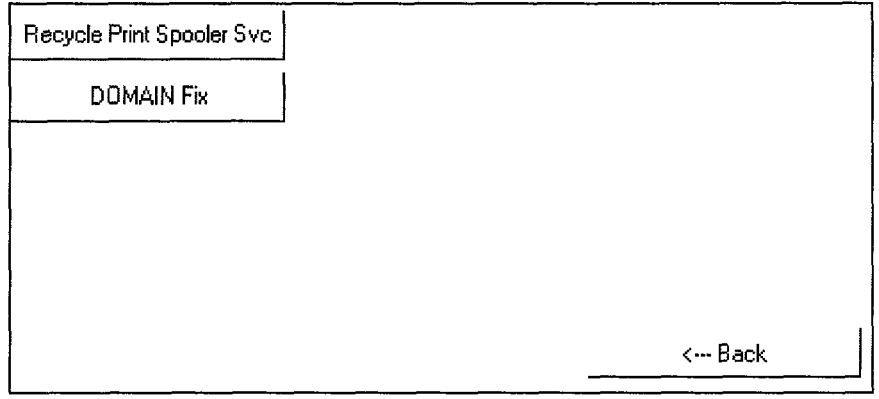
FIG. 13 illustrates an exemplary Remote Tools Continued menu that can be displayed to the user in an exemplary embodiment of the invention.

Remote Console cannot be used to connect to remote workstations or servers from the remote workstation. It can only manipulate the local drives and registry of the remote workstation. For example, a batch file that needs to connect to other resources such as a server will not work, but a batch file that deletes files on the remote workstation will work Selecting the More Remote Tools button from Remote Tools section 40 of FIG. 1 pulls up the Remote Tools Continued menu depicted in FIG. 13. The Back button will return the user to the original Remote Tools menu.

The Recycle Spooler Svc option is used to stop and restart the print spooler service on the remote workstation.

The DOMAIN Fix option is used to correct registry settings on the remote workstation when a domain name does not appear as an option in the Login screen of the remote workstation.

Some of the applications used under the Remote Tools section are installed from the Windows Server Resource Kit. The user can install these applications by running the applicable Windows Setup program.

FIGS. 14A-14F illustrate processing logic for a plurality of scenarios in an exemplary embodiment of the invention. Each figure includes several scenarios that illustrate the processing logic that applies to specific scenarios. Each scenario begins with a customer user call into a call center, help desk or similar functional operation as indicated in block 100. Upon receiving the call, the help desk analyst launches the encapsulated software support tools application (also referred to herein as Support Center Tools or SCTools) and connects to the remote workstation, as indicated in logic block 102. Depending on the nature of the customer user's problem (i.e., applicable scenario), a different processing path will be followed. The different scenarios in FIGS. 14A-14E are identified in decision blocks 104, 122, 130, 200, 206, 212, 220, 300, 308, 316, 322, 400, 406, 412, 418, 500, 508, 516, 600, and 610. The scenarios depicted in these figures are not intended to be exhaustive, or all inclusive. Other scenarios can be added as the business need arrives, or as technology develops further. The order in which the scenarios are listed in these figures is not intended to represent any type of ordered checklist to be followed by the analyst in addressing the customer's reported problem.

Figure 14A:
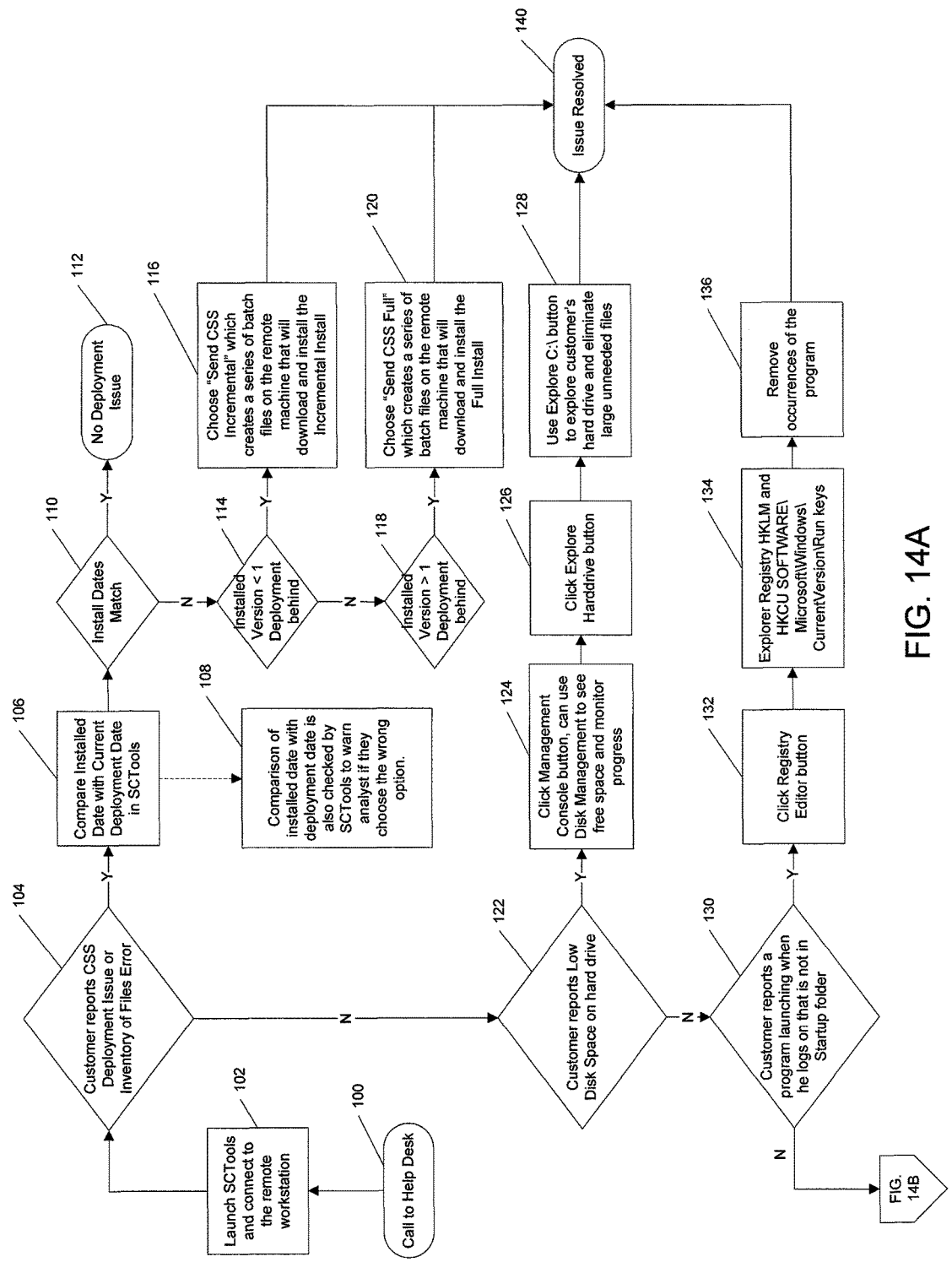
FIGS. 14A-14F illustrate processing logic for a plurality of scenarios in an exemplary embodiment of the invention.

In FIG. 14A, three scenarios are depicted. In a first scenario, the customer reports a CSS deployment issue of an Inventory of Files error, as indicated in decision block 104. The installed date for CSS is compared with the current deployment date in SCTools as indicated in logic block 106. The comparison of installed date with deployment date is also checked by SCTools to warn the analyst if the analyst chooses the wrong option. This is indicated in logic block 108 and by the dashed line connection between logic blocks 106 and 108. In decision block 110, a test is performed to determine if the install and deployment dates match. If they do, there is no deployment issue and processing ends in termination block 112. If the dates do not match, a test is performed in decision block 114 to determine if the installed version is less than one deployment version behind. If that is the case, the analyst chooses to "Send CSS Incremental" which creates a series of batch files on the remote workstation that will download and install the incremental install, as indicated in logic block 116. Otherwise, the installed version is more than one deployment version behind, as determined in decision block 118. In this case, the analyst chooses to "Send CSS Full" which creates a series of batch files on the remote workstation that will download and install the full install, as indicated in logic block 120. From both logic blocks 116 and 120, the issue has been resolved as indicated in termination block 140.

A second scenario depicted in FIG. 14A is indicated in decision block 122. In this scenario, the customer reports a low disk space on hard drive problem. In this situation, the analyst selects "Management Console" and uses "Disk Management" to view the amount of free space and monitor progress. The analyst selects the Explore Hard Drive option as indicated in logic block 126. The analyst then uses the "Explore C:\" button to explore the customer's hard drive and eliminate large unneeded files. This step is indicated in logic block 128. The issue is then resolved as indicated in termination block 140.

In the third scenario depicted in decision block 130 of FIG. 14A, the customer reports a program launching when the customer logs on that is not in the Startup folder. The analyst selects the "Registry Editor" button as indicated in logic block 132. Next, as indicated in logic block 134, the analyst explores the Registry HKLM and HKCU Software\Windows\CurrentVersion\Run keys, and removes occurrences of the program (logic block 138). The issue is then resolved as indicated in termination block 140. The off page connector in FIG. 14A refers to FIG. 14B which illustrates the next four scenarios.

Figure 14B:
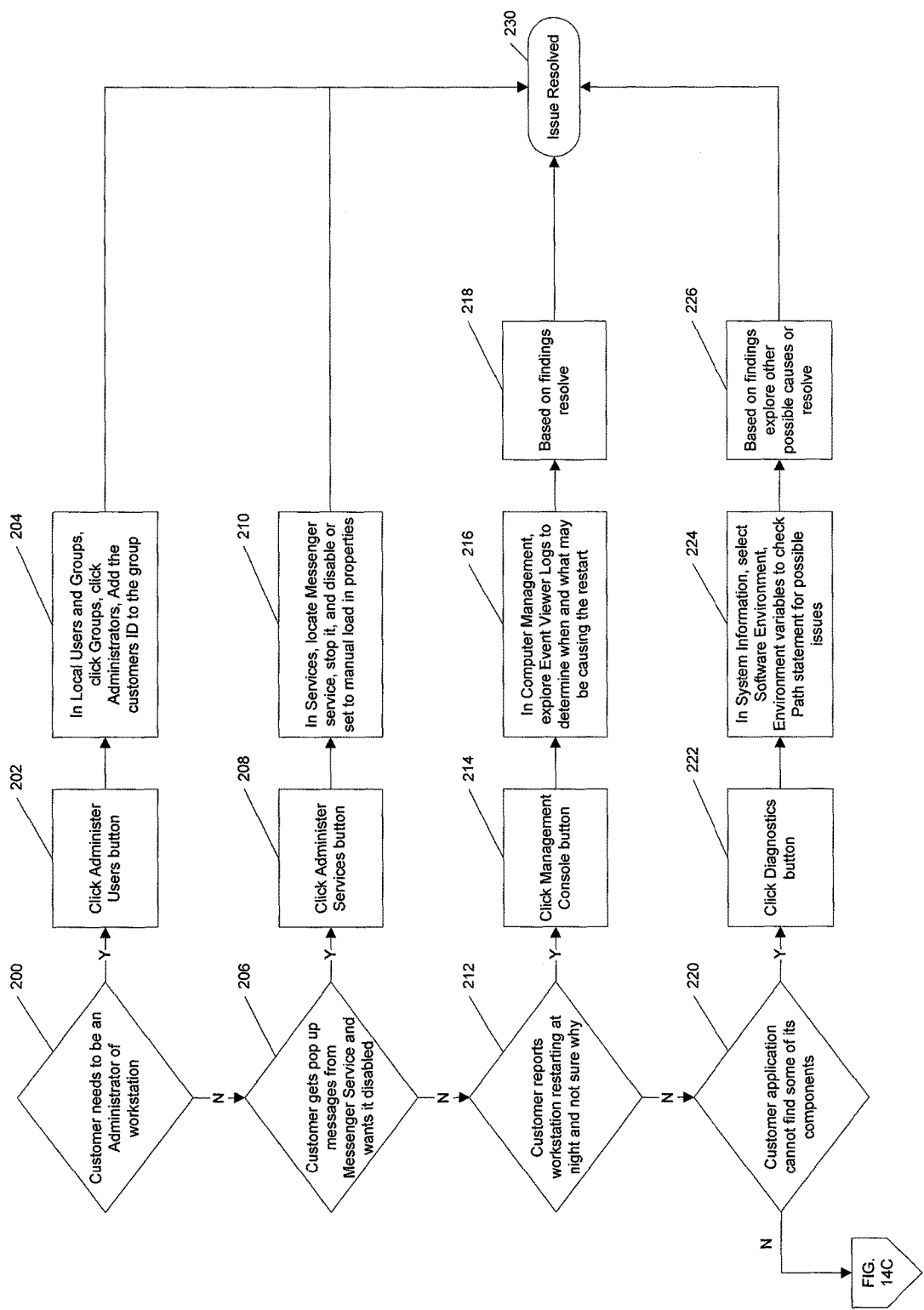

In the first scenario depicted in decision block 200 of FIG. 14B, the customer reports that he needs to be an administrator of the workstation. The analysts selects the "Administer Users" button as indicated in logic block 202. Next, as indicated in logic block 202, in "Local Users and Groups" the analyst selects "Groups, then "Administrators," and adds the customer's ID to the group. This step is indicated in logic block 204. This resolves the issue as indicated in termination block 230.

In the second scenario depicted in decision block 206 of FIG. 14B, a customer reports getting a pop up message from Messenger Service and wants it disabled. The analyst selects the "Administer Services" button as indicated in logic block 208. The analyst locates "Messenger Service" in "Services," stops it, and disables or sets to manual load in "Properties." The issue is then resolved as indicated in termination block 230.

In the third scenario depicted in decision block 212 of FIG. 14B, a customer reports that his workstation is restarting at night and does not know the reason. The analyst selects the "Management Console" button as indicated in logic block 214. Next, as indicated in logic block 216, in "Computer Management," the analyst explores the 'Event Viewer Logs" to determine when and what may be causing the restart. The problem is then resolved based on the analyst's findings as indicated in logic block 218. The issue is thus resolved as indicated in termination block 230.

In the fourth scenario depicted in decision block 220 of FIG. 14B, a customer reports that an application cannot find some of its components. The analyst selects the "Diagnostics" button as indicated in logic block 222. Next, as indicated in logic block 224, in "System Information," the analyst selects "Software Environment, Environment variables" to check the path statement for possible issues. Based on the findings, the analyst can explore other possible causes or resolve the problem as indicated in logic block 226. The issue is thus resolved as indicated in termination block 230. The off page connector in FIG. 14B refers to FIG. 14C which illustrates the next four scenarios.

Figure 14C:
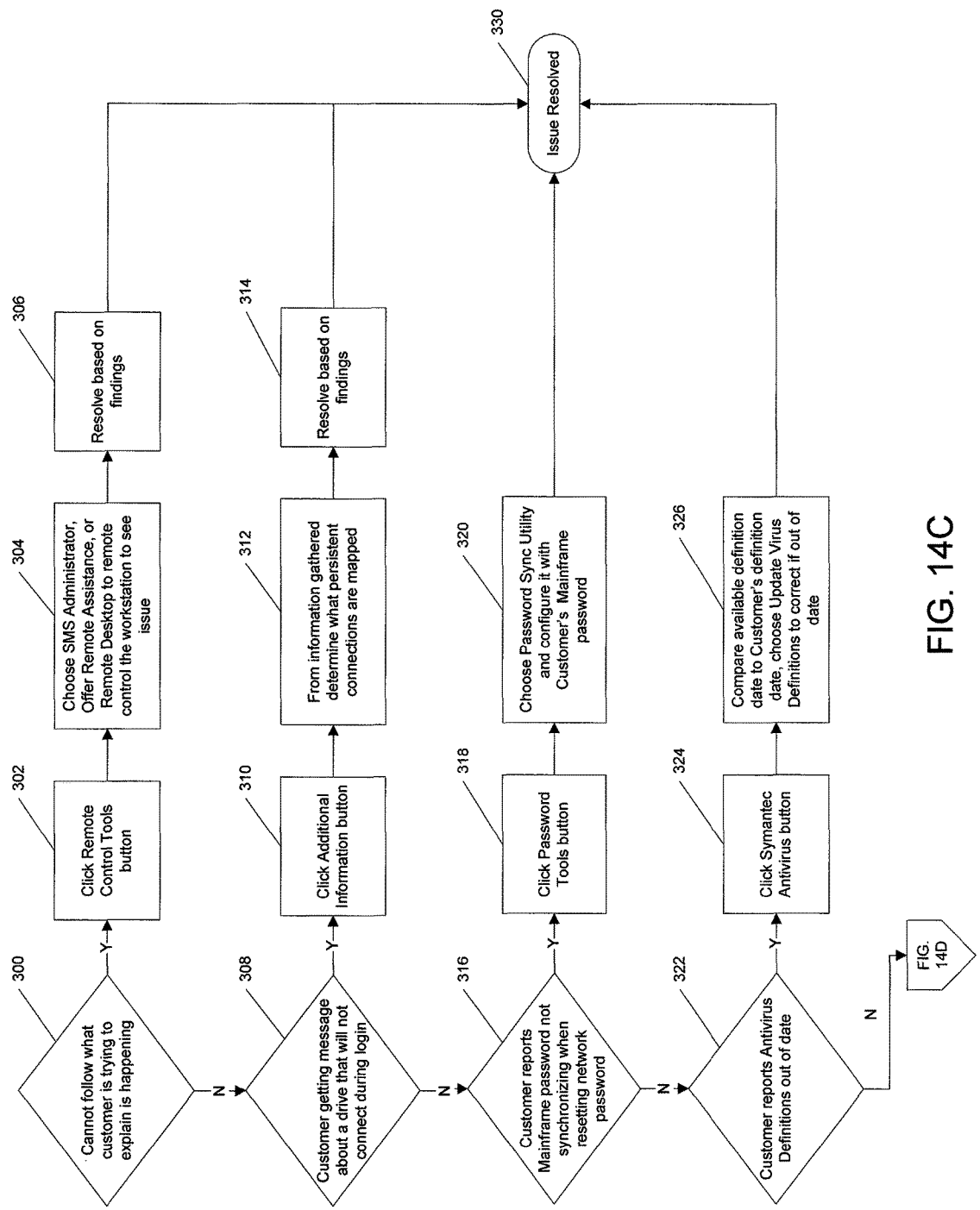

In the first scenario depicted in decision block 300 of FIG. 14C, the analyst cannot follow the customer's explanation of the problems that are occurring. The analyst selects the "Remote Control Tools" button as indicated in logic block 302. Next, the analyst chooses "SMS Administrator, Offer Remote Assistance, or remote Desktop" to remote control the workstation to determine the customer's issue. This step is indicated in logic block 304. The analyst resolves the issue based on the findings as indicated in logic block 306. The issue is thus resolved as indicated in termination block 330.

In the second scenario depicted in decision block 308 of FIG. 14C, the customer reports getting a message about a drive that will not connect during log in. The analyst selects the "Additional Information" as indicated in logic block 310. From the information gathered, the analyst determines which persistent connections are mapped as indicated in logic block 312. The analyst resolves the issue based on the findings as indicated in logic block 314. The issue is thus resolved as indicated in termination block 330.

In the third scenario depicted in decision block 316 of FIG. 14C, the customer reports that the mainframe password is not synchronized when resetting the network password. The analyst selects the "Password Tools" button as indicated in logic block 318. Next, the analyst chooses the "Password Sync Utility" and configures it with the customer's mainframe password. This step is indicated in logic block 320. The issue is thus resolved as indicated in termination block 330.

In the fourth scenario depicted in decision block 322 of FIG. 14C, the customer reports that the antivirus definitions are out of date. The analyst selects the "Symantec Antivirus" button as indicated in logic block 324. The use of antivirus software from Symantec in the exemplary embodiments described herein should not be regarded as limiting in any way. The encapsulation of software support tools application can be adapted to work with any antivirus software product. As indicated in logic block 326, the analyst compares the available definition date to the customer's definition date and chooses "Update Virus Definitions" to correct the problem if the antivirus definitions are out of date. The issue is thus resolved as indicated in termination block 330. The off page connector in FIG. 14C refers to FIG. 14D which illustrates the next four scenarios.

Figure 14D:
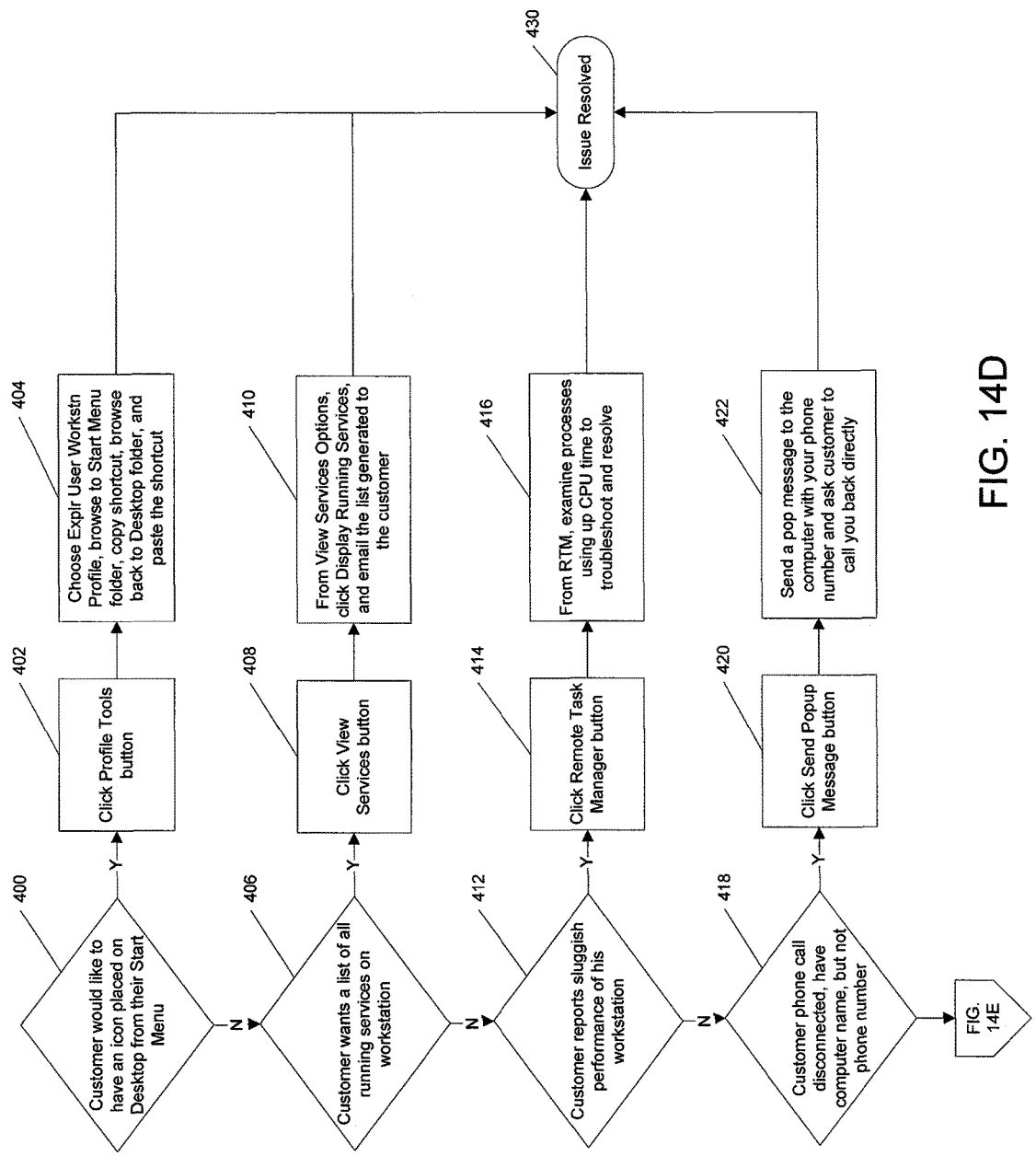

In the first scenario depicted in decision block 400 of FIG. 14D, the customer is requesting that an icon from the customer's Start Menu be added to the desktop. The analyst selects the "Profile Tools" button as indicated in logic block 402. The analyst then chooses "Explr User Workstn Profile," browses to the Start Menu folder, copies the shortcut, browses back to the Desktop folder, and pastes the shortcut. This step is indicated in logic block 404. The issue is thus resolved as indicated in termination block 430.

In the second scenario depicted in decision block 406 of FIG. 14D, the customer is requesting a list or all ruing services on the workstation. The analyst selects the "View Services" button as indicated in logic block 408. From the View Services option, the analyst then selects "Display Running Services" and emails the list generated to the customer as indicated in logic block 410. The issue is thus resolved as indicated in termination block 430.

In the third scenario depicted in decision block 412 of FIG. 14D, the customer is reporting sluggish performance of a workstation. The analyst selects the "Remote Task Manager" button as indicated in logic block 414. From RTM, the analyst examines processes consuming CPU time to troubleshoot and resolve, as indicated in logic block 416. The issue is thus resolved as indicated in termination block 430.

In the fourth scenario depicted in decision block 418 of FIG. 14D, the customer's phone call to the Help Desk has been disconnected, the analysts having the name of the computer, but not the customer's phone number. The analyst selects the "Send Pop Up Message" button as indicated in logic block 420. The analyst then sends a pop-up message with the analyst's phone number and asks the customer to call back the analyst directly, as indicated in logic block 422. The issue is thus resolved as indicated in termination block 430. The off page connector in FIG. 14D refers to FIG. 14E which illustrates the next three scenarios.

Figure 14E:
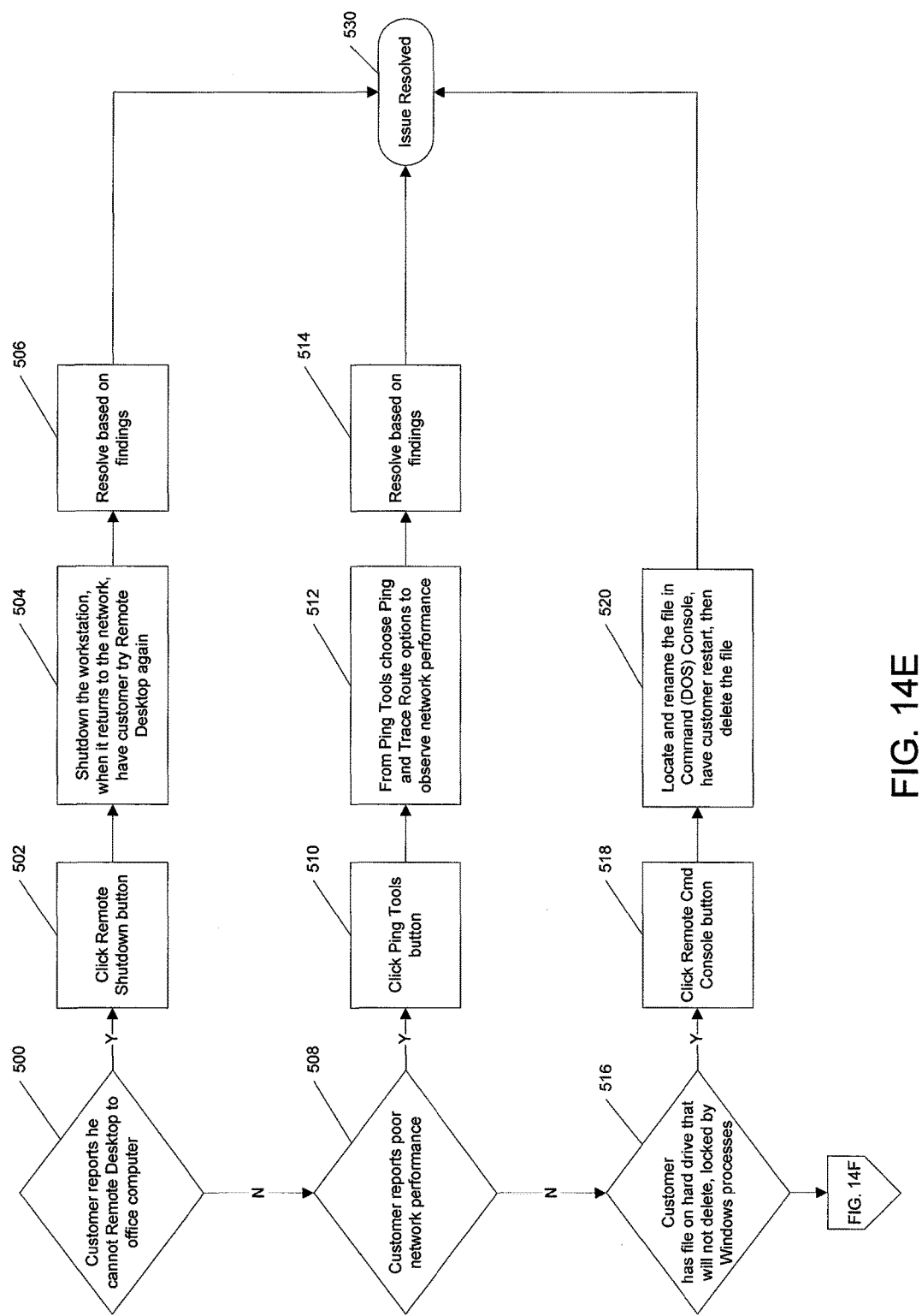

In the first scenario depicted in decision block 500 of FIG. 14E, the customer is reporting an inability to remote desktop to an office workstation. The analyst selects the "Remote Shutdown" button as indicated in logic block 502. The analyst then shuts down the workstation. When the workstation returns to the network, the analyst advises the customer to attempt remote desktop again. These steps are indicated in logic block 504. The problem is resolved based on the findings, as indicated in logic block 506. The issue is thus resolved as indicated in termination block 530.

In the second scenario depicted in decision block 508 of FIG. 14E, the customer is reporting poor network performance. The analyst selects the "Ping Tools" button as indicated in logic block 510. From the Ping Tools option, the analyst then selects the "Ping and Trace Routes" option to observe network performance as indicated in logic block 512. The problem is resolved based on the findings, as indicated in logic block 514. The issue is thus resolved as indicated in termination block 530.

In the third scenario depicted in decision block 516 of FIG. 14E, the customer is reporting a file on the hard drive that will not delete, and is locked by Windows processes. The analyst selects the "Remote Cmd Console" button as indicated in logic block 518. The analyst locates and renames the file in the Command (DOS) Console, and has the customer restart the workstation and delete the file. These steps are indicated in logic block 520. The issue is thus resolved as indicated in termination block 530. The off page connector in FIG. 14E refers to FIG. 14F which illustrates the final two scenarios.

Figure 14F:
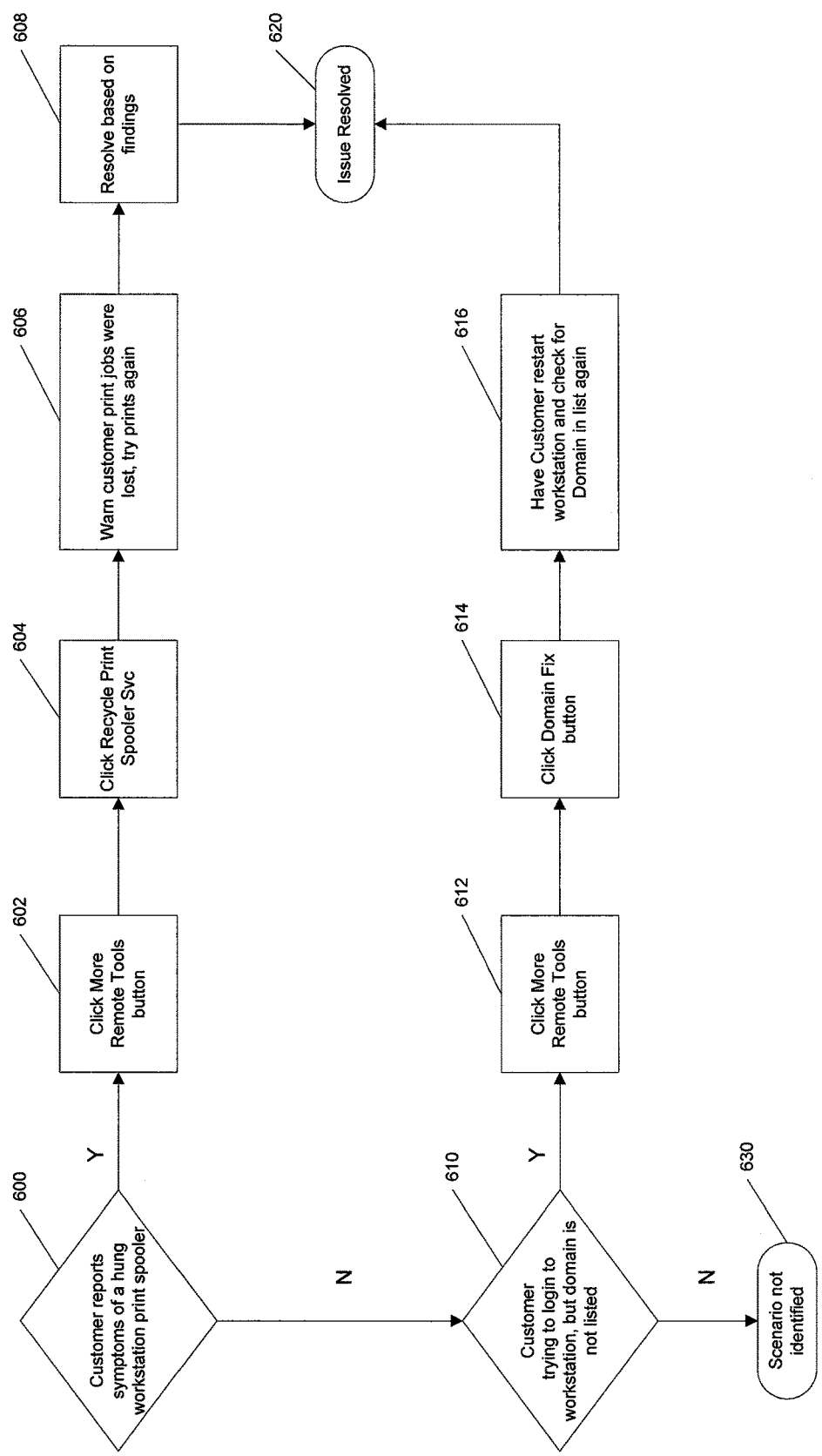

In the first scenario depicted in decision block 600 of FIG. 14F, the customer is reporting symptoms of a hung workstation print spooler. The analyst selects the "More Remote Tools" button as indicated in logic block 602. The analyst then selects "Recycle Print Spooler Svc" as indicated in logic block 604. The analyst then warns the customer that the print jobs were lost and should be sent to the printer again, as indicated in logic block 606. The problem is resolved based on the findings, as indicated in logic block 608. The issue is thus resolved as indicated in termination block 620.

In the second scenario depicted in decision block 610 of FIG. 14F, the customer reports trying to login to the workstation, but the domain is not listed. The analyst selects the "More Remote Tools" button as indicated in logic block 612. The analyst then selects the "Domain Fix" button as indicated in logic block 614. The customer is then asked to restart the workstation and check again for the domain in the list as indicated in logic block 616. The issue is thus resolved as indicated in termination block 620.

If none of the preceding scenarios are applicable to the customer's reported problem, the scenario is not identified for processing via the encapsulated software support tools application described herein. This is indicated in termination block 630. Other steps would need to be taken to resolve the customer's reported problem.

The system and method embodiments of the present invention have been described as computer-implemented components and processes. It is important to note, however, that those skilled in the art will appreciate that the mechanisms of the disclosed embodiments are capable of being distributed as program products in a variety of forms, regardless of the particular type of physical signal bearing media utilized to carry out the distribution. Examples of signal bearing media include, without limitation, recordable-type media such as diskettes or CD ROMs.

The corresponding structures, materials, acts, and equivalents of any means plus function elements in the claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed is:

1. A method, comprising:
   launching at least one remote workstation software support tool pre-populated with information for a remote workstation from a support center utility application interface based on an issue reported by an end user; and
   selecting a remote console tool from the plurality of remote workstation software support tools and loading a command prompt via the support center utility application interface that resides on the remote workstation, the command prompt allowing the at least one process running on the remote workstation to be killed via an input command at the support center utility application interface; and
   performing a test to determine whether an install date associated with the remote workstation and a deployment date of the support center utility application match, and if so, no changes are deployed, and if the dates do not match, a test is performed to determine if a support center utility application installed version is less than one deployment version behind to a most recent version of the support center utility application, and if so, creating a series of batch files on the remote workstation that will download and install an incremental install of the support center utility application.

2. The method of claim 1 wherein the plurality of remote workstation software support tools comprises a plurality of vendor-supplied workstation troubleshooting tools.

3. The method of claim 1 wherein the plurality of remote workstation software support tools comprises a plurality of enterprise internal workstation troubleshooting tools.

4. The method of claim 1 wherein the plurality of remote workstation software support tools comprises at least two tools from among a registry editor tool, a password tool, an explore hard drive tool, an antivirus tool, a diagnostics tool, an administer users tool, an administer services tool, a remote control tasks tool, a remote task manager tool, a send pop-up message tool, a ping tool, a profile tool, and a remote command console tool.

5. The method of claim 1 wherein the plurality of remote workstation software support tools further comprises a tool to control the print spooler service on the remote workstation.

6. The method of claim 1 wherein the plurality of remote workstation software support tools further comprises a tool to correct registry settings on the remote workstation.

7. A system, comprising:
   a data storage that stores a plurality of remote workstation software support tools;
   a processor that executes a plurality of components, including:
   a component that launches at least one remote workstation software support tool pre-populated with information for a remote workstation from a support center utility application interface based on an issue reported by an end user;
   a component that selects a remote console tool from the plurality of remote workstation software support tools and load a command prompt via the support center utility application interface that resides on the remote workstation, the command prompt that allows the at least one process that runs on the remote workstation to be killed via an input command at the support center utility application interface; and
   a component that performs a test to determine whether an install date associated with the remote workstation and a deployment date of the support center utility application match, and if so, no changes are deployed, and if the dates do not match, a test is performed to determine if a support center utility application installed version is less than one deployment version behind to a most recent version of the support center utility application, and if so, the component creates a series of batch files on the remote workstation that will download and install an incremental install of the support center utility application.

8. The system of claim 7 wherein the plurality of remote workstation software support tools comprises a plurality of vendor-supplied workstation troubleshoot tools.

9. The system of claim 7 wherein the plurality of remote workstation software support tools comprises a plurality of enterprise internal workstation troubleshoot tools.

10. The system of claim 7 wherein the plurality of remote workstation software support tools comprises at least two tools from among a registry editor tool, a password tool, an explore hard drive tool, an antivirus tool, a diagnostics tool, an administer users tool, an administer services tool, a remote control tasks tool, a remote task manager tool, a send pop-up message tool, a ping tool, a profile tool, and a remote command console tool.

11. The system of claim 7 wherein the plurality of remote workstation software support tools further comprises a tool to control the print spooler service on the remote workstation.

12. The system of claim 7 wherein the plurality of remote workstation software support tools further comprises a tool to correct registry settings on the remote workstation.

13. A non-transitory computer program product comprising a computer readable medium having computer readable code embedded therein, the computer readable medium comprising:
program instructions that launch at least one remote workstation software support tool pre-populated with information for a remote workstation from a support center utility application interface based on an issue reported by an end user;
program instructions that select a remote console tool from the plurality of remote workstation software support tools and load a command prompt via the support center utility application interface that resides on the remote workstation, the command prompt allowing the at least one process running on the remote workstation to be killed via an input command at the support center utility application interface; and
program instructions that perform a test to determine whether an install date associated with the remote workstation and a deployment date of the support center utility application match, and if so, no changes are deployed, and if the dates do not match, a test is performed to determine if a support center utility application installed version is less than one deployment version behind to a most recent version of the support center utility application, and if so, the program instructions create a series of batch files on the remote workstation that will download and install an incremental install of the support center utility application.

14. The non-transitory computer program product of claim 13 wherein the plurality of remote workstation software support tools comprises a plurality of vendor-supplied workstation troubleshooting tools.

15. The non-transitory computer program product of claim 13 wherein the plurality of remote workstation software support tools comprises a plurality of enterprise internal workstation troubleshooting tools.

16. The non-transitory computer program product of claim 13 wherein the plurality of remote workstation software support tools comprises at least two tools from among a registry editor tool, a password tool, an explore hard drive tool, an antivirus tool, a diagnostics tool, an administer users tool, an administer services tool, a remote control tasks tool, a remote task manager tool, a send pop-up message tool, a ping tool, a profile tool, and a remote command console tool.

17. The non-transitory computer program product of claim 13 wherein the plurality of remote workstation software support tools further comprises a tool to control the print spooler service on the remote workstation.

18. The non-transitory computer program product of claim 13 wherein the plurality of remote workstation software support tools further comprises a tool to correct registry settings on the remote workstation.

\* \* \* \* \*